2,812,312
Patented Nov. 5, 1957

2,812,312

REGENERATION OF ION EXCHANGE RESINS

William K. Wilkinson, Waynesboro, Va., assignor to E. I. du Pont de Nemours and Company, Wilmington, Del., a corporation of Delaware No Drawing. Application January 18, 1957, Serial No. 634,838

12 Claims. (Cl. 260—2.1)

This invention relates to regeneration of ion exchange resins and more particularly to the regeneration of ion exchange resins depleted by ions of large molecular weight which are tenaciously and, as such, irremovably attached.

In an improved process for the manufacture of acrylonitrile polymers, polymerization takes place in the presence of an anionic surfactant. The anionic surfactants preferred for this improved polymerization are of the type which are a mixture of the sodium salts of sulfated fatty alcohols ranging from $C_8$ to $C_{18}$ such as are present in the technical grade of lauryl alcohol. Other similar salts of sulfated higher fatty alcohols are also effective in this improved process. Since polymerization of acrylonitrile usually takes place at about 80% to 90% conversion, there is the obvious economic necessity of recovery and reusing the monomers.

The presence of the anionic surfactant in the recovered aqueous monomer solution prevents recovery of the monomers due to excessive foaming in the recovery distillation column. Normally after dilution of the recovered aqueous solutions of monomers with polymer washings the anionic surfactant concentration is about 0.03% or 300 parts per million. It was found that foaming still persisted even when the anionic surfactant was reduced to as little as 10 parts per million in the liquor undergoing distillation for monomer recovery. Therefore, it becomes imperative to remove the sodium lauryl sulfate or its equivalent before sending the dilute monomer liquor to the distillation column.

The removal of the sodium lauryl sulfate and like anionic surfactants from the recovered aqueous solution of monomers can be accomplished readily by passing the same through a bed of strong anionic exchange resins. But no method is known for regenerating the depleted resin for re-use and experts in this field have said that under normal conditions these large molecules can not be removed practically.

It is therefore an object of this invention to regenerate ion exchange resins which have become degenerated by high molecular weight ions strongly bonded thereto. A further object of this invention is to regenerate a strong anionic exchange resin of the quaternary ammonium type depleted by acceptance of ions of sulfated fatty alcohols. Other objects will be apparent from the description that follows.

The objects of this invention are accomplished by degrading to smaller units the accepted groups on the exchange resin and then removing the degraded products. In the case of a quaternary ammonium anionic exchange resin depleted by the acceptance of sulfated higher fatty alcohol ions degradation is accomplished by acid hydrolysis as illustrated by the following equation:

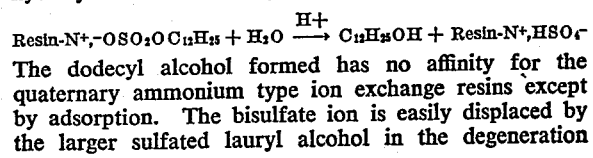

The dodecyl alcohol formed has no affinity for the quaternary ammonium type ion exchange resins except by adsorption. The bisulfate ion is easily displaced by the larger sulfated lauryl alcohol in the degeneration cycle and does not require an additional step of exchange to another anion, e. g., $OH^-$ or $Cl^-$. Thus, the sulfated alcohols are decomposable by hydrolysis and can be removed from quaternary ammonium type exchange resins although sulfonates are not so easily degraded and are not removable.

While this invention will be further illustrated and explained by reference to removal of sulfated higher alcohols from strong anionic exchange resins of the quaternary ammonium type, it is to be understood that the invention is broadly applicable to the removal of any large molecular weight ion strongly bound to the exchange resin by subjecting the attached ion to an acidic degradative reaction.

In the usual regeneration step, an ionic material is displaced from the resin by salts, acids or alkali which shift the equilibrium. The following equations demonstrate the usual cases of anion displacement:

1. $Resin\text{-}N^+, Cl^- + NaOH \rightarrow Resin\text{-}N^+, OH^- + NaCl$
2. $2(Resin\text{-}N^+, Cl^-) + Na_2SO_4 \rightarrow$
   $(Resin\text{-}N^+)_2, SO_4^{=} + 2NaCl$ When the anion is large (e. g., $C_{12}H_{25}OSO_2O^-$), the ionic bond between the resin and the anion is so strong that almost none of this large anion is removed by a salt. The table below shows the capacity of a quarternary ammonium chloride type resin identified as "Amberlite" IRA–400 made by Rohm and Haas to remove a commercial sodium lauryl sulfate ("Duponol" PC) from 0.1% aqueous solution thereof.

| Treatment for Regeneration | Capacity of Resin—Lbs. of sodium lauryl sulfate removed Per cu. ft. of Resin |
|---|---|
| None (unused resin) | 8–10 |
| 6% sodium chloride wash at 25° C | None |
| 1% potassium hydroxide at 25° C | [1] 1.0 |
| 1% sodium hydroxide at 25° C | [1] 1.0 |
| 5% sodium hydroxide at 25° C | [1] 1–2 |
| 5% sodium hydroxide 60° C | [1] 1–2 |
| 9% hydrochloric acid 90° C., 1 hr | [2] 7 |
| 4.5% hydrochloric acid 90° C., 1 hr | [2] 6.1 |
| 2% hydrochloric acid 90° C., 1 hr | [2] 4.7 |
| 10% sulfuric acid 90° C., 1 hr | [2] 7 |
| 3% sulfuric acid 90° C., 1 hr | [2] 6 |

[1] Dropped to zero on subsequent regeneration cycles.
[2] On each of several cycles.

The results in the above table were obtained in the following manner. Ten grams of wet new anion exchange resin (vinyl pyridine/divinyl benzene copolymers quarternarized with dimethyl sulfate and sold by Rohm and Haas as IRA–400) was placed into a glass tube of one-half inch diameter. Through this resin a 0.1% solution of sodium lauryl sulfate ("Duponol" PC) in water was run at a rate of 10–30 ml. per minute. Periodically air was blown through the effluent to test for foaming which denoted the depletion of the resin. The resin was regenerated in the laboratory by removal from the column and heating with 400 ml. of the designated reagent and placed back into the column. A rinse with 100 ml. of acetone then 400 ml. of water made the resin ready for depletion a second time to test the effectiveness of the regeneration procedure.

Any quaternary ammonium type anionic exchange resin may be used effectively to remove the large lauryl sulfate anion from recovered monomer solution. Typical resins of this type are Rohm and Haas' IRA–400 and IRA–401 and Dow's Dowex 50–X–4 and Dowex 50–X–8. The resins differ chiefly in the amount of divinyl benzene crosslinking agent.

Regeneration of the depleted resin is best carried out with 5% sulfuric acid at about 90° C. Other concentrations and temperatures may be used and hydrochloric acid may be used in place of sulfuric acid. Time, temperature and life of the exchange resin are all factors in determining the optimum regeneration conditions. After the acid hydrolysis reaction is completed, it is important to remove the freed fatty alcohol from the resin bed. If this is not done to a large extent, the bed will not be effective in removing sodium lauryl sulfate from the liquid undergoing treatment because the fatty alcohol keeps the water solution from the resin surface. One effective method of removing the fatty alcohol is by washing the resin bed with acetone in which the alcohol is soluble. For instance, regeneration with hot 5% sulfuric acid following only by a water wash resulted in the subsequent removal of only 0.5 pound of sodium lauryl sulfate per cubic foot of resin in the degeneration step, whereas an acetone rinse before the water wash gave a swollen resin capable of removing 18 pounds of sodium lauryl sulfate per cubic foot of resin in the degeneration step. Other solvents for the fatty alcohols such as ethanol, hexane, benzene, ether, carbon tetrachloride, etc., may be used in a similar way. The use in aqueous solution of fatty alcohol emulsifying agents such as an alkylphenolethylene oxide condensation product sold by General Dyestuffs Corporation under the trade name "Igepal" CA or a quaternary ammonium type detergent such as N-dodecyl-NNN-trimethylammoniumdodecylbenzenesulfonate is also effective in removing residual fatty alcohols from the regenerated resin bed.

The invention provides a very satisfactory method of regenerating exchange resins depleted by the acceptance of high molecular weight ions which are susceptible to degradative reaction and especially a method of regenerating strong anionic exchange resins of the quaternary ammonium type when depleted with lauryl sulfate ions as herein described. By being able to remove sodium lauryl sulfate effectively from recovered acrylonitrile monomer solution the ready recovery of unreacted acrylonitrile monomer from polymerization residue is assured.

It will be apparent that many widely different embodiments of this invention may be made without departing from the spirit and scope thereof, and therefore it is not intended to be limited except as indicated in the appended claims.

I claim:

1. The process of regenerating ion exchange resins which have been used to remove higher alkyl sulfates from an aqueous solution and to which the said alkyl sulfates are firmly attached which comprises regenerating the resin by contacting the degenerated ion exchange resin with a dilute solution of a strong mineral acid, and removing the released alkyl alcohol from the resin.

2. The process of claim 1 in which the mineral acid is sulfuric acid.

3. The process of claim 1 in which the degenerated resin is treated with the dilute mineral acid at about 90 C. for about one hour.

4. The process of claim 1 in which the released alkyl alcohol is washed from the ion exchange resin with a solvent.

5. The process of removing small amounts of higher alkyl sulfate from an aqueous solution containing arcylonitrile which comprises passing the said solution over a bed of a quaternary ammonium type ion exchange resin which has a strong affinity for the said alkyl sulfate, regenerating the degenerated resin bed by subjecting it to the action of a hot dilute solution of strong mineral acid until the alkyl sulfate is split and removing the released alkyl alcohol.

6. The process of claim 5 in which the dilute acid is sulfuric acid in the concentration of about a 3% to 10% solution.

7. The process of claim 5 in which the treatment with the mineral acid is at about 90° C.

8. The process of claim 5 in which the released alkyl alcohol is removed by washing the resin bed with a solvent.

9. The process of claim 5 in which the alkyl alcohol is removed from the bed by washing with acetone.

10. The process of claim 5 in which the alkyl group has from 8 to 18 carbon atoms.

11. The process of claim 5 in which the alkyl sulfate is sodium lauryl sulfate.

12. The process of removing small amounts of higher alkyl sulfate from an aqueous solution containing acrylonitrile which comprises passing the said solution over a bed of a quaternary ammonium type ion exchange resin which has a strong affinity for the said alkyl sulfate, regenerating the degenerated resin bed by subjecting it to the action of a hot dilute solution of strong mineral acid until the alkyl sulfate is split, removing the released alkyl alcohol, and recovering the acrylonitrile by distillation.

No references cited.